Figure 1:
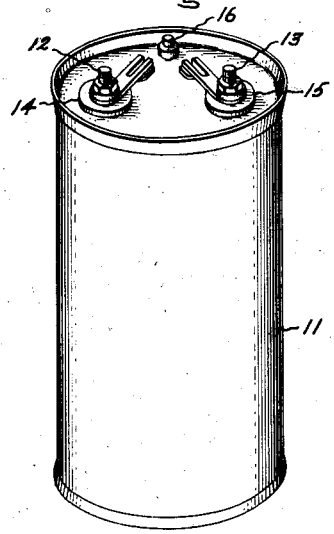

Nov. 26, 1935.  F. M. CLARK ET AL  2,022,500
ELECTROLYTIC DEVICE
Filed Feb. 2, 1935

Inventors:
Frank M. Clark,
John H. Koenig,
by Harry E. Dunham
Their Attorney.

Patented Nov. 26, 1935

2,022,500

UNITED STATES PATENT OFFICE 2,022,500

ELECTROLYTIC DEVICE

Frank M. Clark and John H. Koenig, Pittsfield, Mass., assignors to General Electric Company, a corporation of New York Application February 2, 1935, Serial No. 4,665

9 Claims. (Cl. 175—315)

The present invention relates to electrolytic devices, such as capacitors, rectifiers, lightning arresters, and the like. The object of our invention is to improve the stability and dependability of such devices and in particular to provide electrolytic devices which will retain their operativeness and desirable characteristics even after long periods of inactivity.

Heretofore, electrolytic devices having a current-blocking film of oxide, or the like, formed on one or both of the electrodes have become deteriorated when idle without voltage and especially so when exposed to temperatures somewhat higher than room temperature. Under these conditions the capacity and power factor of such electrolytic devices are most susceptible to depreciation. Capacitors forming part of electric motor equipment and functioning mainly during starting of a motor may be subjected to an elevated temperature for long idle periods.

Undesirable creepage and slow evaporation of the electrolyte and even decomposition of the electrolyte accompanied by harmful gas formation are other disadvantageous properties sometimes encountered which have tended to retard the use of this type of capacitors.

In general two broad types of electrolytic devices have been used in the past: (1) the so-called "wet type", namely, electrolytic devices using a relatively dilute aqueous solution of a salt electrolyte; and (2) the so-called "dry type", namely, devices in which (a) hydrated salt electrolyte has been associated with only enough liquid to produce a viscous liquid or a paste or (b) in which a solid electrolyte has been employed. In some cases a wholly water-free salt electrolyte has been used; in others a small amount of water has been considered essential. In the "dry type" of capacitor a relatively small amount of the electrolyte mixture has been placed between the electrodes or plates, usually as a paste. In some forms of dry electrolytic capacitor a viscous material such as glycerine has been employed to give the electrolyte a desired high viscosity and hygroscopicity.

Since in the manufacture of the "dry" type of capacitor, high temperatures which may be as high as 100° C. have been commonly used, it has been found that the association of water with the electrolyte leads to difficulty in maintaining the exact composition with consequent change in the characteristic and desired electrolyte resistance. The association of an electrolytic salt with small amounts of a liquid to form a paste gives a product characterized by a changing resistance during manufacture and use of the capacitor. Changes in the composition, in addition to varying the resistance, produce also changes in the loss characteristics (power factor) of the capacitor. In the association of an electrolytic salt and a liquid to produce an electrolyte suitable for electrolytic capacitors it has been necessary heretofore to provide a salt and a liquid so selected as to type and relative amounts that the combination is essentially a clear solution at a temperature low enough to allow impregnation (generally not over 100 to 120° C.). The only alternative was to apply the viscous electrolytic paste as a "spread" on a cheesecloth, or other spacer, before assembling the capacitor. This was not only an expensive operation, poorly adapted to quantity production, but resulted in a bulky, soggy type of assembled capacitors of difficult manufacture.

As a consequence of our present invention, we have avoided such limitations, and have produced, as will be described subsequently, an electrolytic mixture whose electrical resistance is substantially constant over a wide range of varying compositions. We have furthermore produced an electrolytic mixture of such characteristics that it can be introduced into the assembled dry capacitor assembly at a temperature well under the temperature at which chemical decomposition will occur even though a clear liquid solution is not obtained. The removal of the limitations heretofore imposed in the construction of capacitors thus makes available a new range of electrolytic substances and combinations. No auxiliary viscous material is required.

The electrolyte used in accordance with our invention consists of a mixture which ordinarily comprises two different types of salts. The salts are blended together at temperatures generally not exceeding 120° C. On cooling, the salts mutually prevent crystallization of one another. Salts adapted for use in accordance with our invention to produce our improved electrolyte ordinarily are solid at room temperatures by themselves but when associated with one another are heavy liquids or are soft plastic solids (or semi-liquids) at room temperature. In a manner the mixtures correspond to "eutectic alloys" of two or more metals.

The electrolyte herein described consists of two or more substances including a salt (said substances being individually solid at room temperature), said electrolyte being characterized by being liquid or pasty at a temperature lower than the melting point of its lowest melting constituent. It has been termed by us herein as a cryohydric electrolyte.

Figure 2:
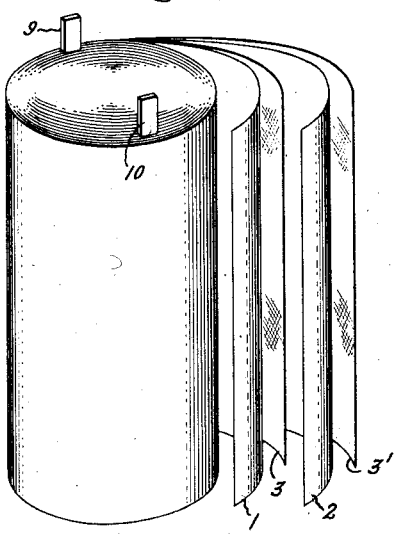
Figure 3:
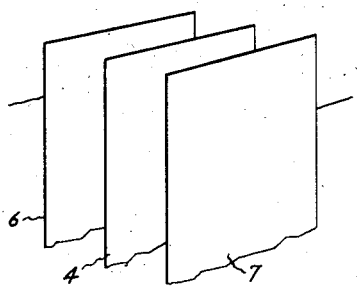
Figure 4:
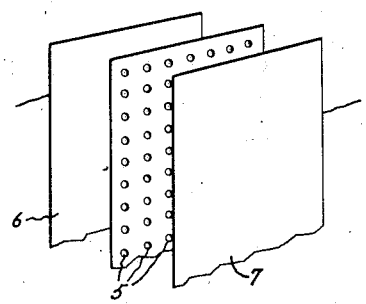
Figure 5:
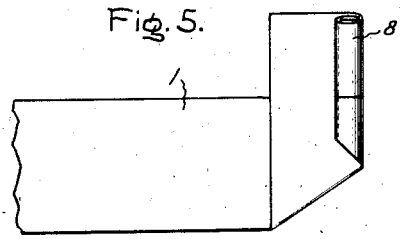

The accompanying drawing shows in Figs. 1 and 2 a rolled type of capacitor assembly suitable for use with our invention; Figs. 3 and 4 illustrate modifications diagrammatically, and Fig. 5 shows a special form of terminal.

As one of the ingredients of the combination of salts in the cryohydric electrolyte embodying our invention we have employed one or more compatible water-soluble salts of an organic acid, as for example an ammonium salt of such acid. For example, one or more of the salts of the following organic acids may be used: formic, acetic, propionic, butyric, lactic, citric, oxalic, carbonic, linoleic, tartaric, or calicylic acids. As the second ingredient in a cryohydric electrolyte embodying our invention we may employ any one of a large number of materials including alkali and ammonium salts and also salts of other metals such, for example, as salts of lead, zinc, calcium, and even acids such as molybdic acid, and also organic materials which do not have any relation to a salt or an acid, as for example a sugar, such as dextrose.

Referring to the drawing, the capacitor illustrated by Fig. 2 comprises armatures or electrodes 1, 2 of suitable metal, for example, aluminum, tantalum, or magnesium. The capacitor armatures ordinarily consist of aluminum foil having a thickness of about .001 to .003 inch. Between them is located a porous spacer 3 of imbibitory material, such for example, as cheesecloth or porous paper, which is impregnated or filled with the electrolytic mixture during the fabrication of the capacitor. In the drawing two spacers 3 and 3' have been shown, the capacitor of Figs. 1 and 2 being of the rolled type and it being desired that the spacer should be present in all cases between adjacent turns of the wound-up strip armatures.

The spacers 3, 3' which preferably consist of cheesecloth should be free from chlorides and may have a thickness between the limits of about .0025 and .0055 inch, although this thickness is not critical. The thread count can be varied over a wide range. I have found cheesecloth having a thread count of 40 x 44 to be satisfactory. A paper spacer having a porosity similar to that of blotting paper may be used as shown at 4, Fig. 3. The thickness of the paper may be between the limits of .00075 and .001 inch. The spacer may be perforated, that is, provided with holes as shown at 5, Fig. 4. It has been determined that paper containing one m. m. diameter perforations spaced 1 to 2 m. m. apart is satisfactory. A spacer is not an absolutely essential part of the present invention and may be omitted, the composition being spread on the electrodes. Its use, however, is recommended.

Before the electrodes are assembled, a film of oxide may, and preferably should, be produced thereon, preferably by electrolytic treatment in accordance with well understood practice. While the electrodes commonly consist of lengths of thin metal foil as shown in Fig. 2, it is permissible to use plates which may be flat, as indicated at 6, 7 in Figs. 3 and 4, or may be of corrugated, or other form (not shown).

A suitable electrolyte to be employed for the preliminary electrolytic oxidation treatment may be made by dissolving 80 parts of boric acid and 2 parts of borax by weight in 1000 parts of distilled water. These constituents may be varied considerably without seriously affecting the results. The oxidation treatment can be carried out entirely in one container, or the electrode material, when consisting of long strips of foil, can be traversed successively through a series of electrolytic baths in different containers, the baths increasing in concentration as the foil progresses from the first to the last batch.

Preferably the electrolyte is heated during the forming process, a temperature of about 90 to 95° C. being suitable. The voltage at which the electrolytic treatment is carried out preferably should be equal to or not more than about ten per cent greater than the maximum voltage at which the completed capacitor is intended to be operated. For capacitors desired for alternating current operation the treatment of the foil, plates, or other form of electrodes, may be carried out either with alternating or direct current. Preferably direct current is used, employing a voltage equal to or slightly exceeding the peak of the alternating current voltage at which the capacitors are intended to be operated. Aluminum foil intended for operation in the completed capacitor with 110 volt alternating current may be oxidized by direct current treatment, the foil being made the anode and a voltage of 160 volts being applied between anode and cathode.

The rate of the passage of the foil through the electrolyte and the amount of current depends upon the conditions as well understood. Ordinarily a foil when the oxidizing treatment has been completed should not pass more than one ampere per square foot at 160 volts, direct current, while immersed in electrolyte as above described and at a temperature of 95° C. After the foil has been oxidized, it may be dried and stored in a dry environment until it is desired for use.

The capacitors are assembled in accordance with well understood practice; for example, by rolling (Fig. 2), or stacking (Figs. 3 and 4), the oxidized foil and the spacer being in proper relation. While it is necessary in capacitors intended for alternating current use to have both armatures filmed or oxidized, it is sufficient when the capacitors are intended for direct current use to have but one foil or armature (the anode) provided with an oxide film. The cathode need not be oxidized and in fact may consist of any metal inert with respect to the electrolyte. Electrical connections are made to the respective armatures in accordance with well understood practice as by folding back one end of the foil as shown at 8 in Fig. 5 or by attaching to the foil electrodes strips 9 and 10, as by riveting or welding, to make electrical connection to exterior terminals.

When the impregnation of the capacitor assembly in a cryohydric electrolyte (as will be described) has been completed, the units are sealed in a suitable can 11. If the latter consists of metal, they are suitably insulated from it. A suitable sealing compound is applied and the terminals 9, 10 are connected to the external contacts 12, 13, suitable insulating bushings 14, 15 being provided. A breathing vent 16 may be applied if desired.

A preferred cryohydric electrolyte for the purposes of our invention, comprising the acetate and borate of ammonium, may be made up as follows: 1 part of boric acid is suspended in 1.77 parts of glacial acetic acid and ammonia gas is introduced into the mixture. The resulting reaction causes a rise of temperature. If necessary, the mixture is cooled to prevent a rise of temperature above about 100 to 110° C. The passage of the ammonia gas into the acid solution results in violent agitation and the formation of ammonium borate and ammonium acetate. The reaction is stopped when the solution is almost neutral but is still slightly acid (pH value from 6.8 to 7). The resulting mixture is a thin turbid liquid at 100° C. and a creamy mass at room temperature. In some cases, depending on the exact pH value at which the reaction is stopped, a thin supernatant liquid separates out on standing. Its presence is not objectionable. It can be entirely eliminated if desired and a non-settling creamy mass of colloidal consistency prepared by carrying the reaction between the acid mixture and ammonia to a pH value of 7 to insure complete acid neutralization.

It is possible to prepare the electrolyte mixture in other ways. For example, acetic acid and boric acid may be separately caused to combine with ammonia and the products finally may be mixed. In some cases water may be added to the acetic acid, thereby assisting the chemical composition of the acid with gaseous ammonia. It is also feasible to use aqueous ammonium hydroxide instead of gaseous ammonia in reaction with the acids. In cases such as the last mentioned, in which water is present in the final product, it is preferred to remove the water. While water does not have a serious deleterious effect upon the impregnated capacitor its presence promotes creepage of the electrolyte over the capacitor armatures and even through the vent hole in the capacitor casing,—conditions which preferably should be avoided.

The mixture of ammonium acetate and ammonium borate should be characterized by less than 5% evaporation loss when heated for six hours at 100° C. in a shallow aluminum vessel. It should not have a tendency to creep over the sides of the aluminum vessel. Other characteristics of our product are as follows:

Normal resistance at 90° C. 1000 cycles 20 to 35 ohms/cm$^3$
Gravity at 25°/15.5° C. 1.3
Viscosity at 100° C. 177 seconds Saybolt universal
Viscosity at 25° C. 5000 seconds Saybolt universal
Refractive index at 40° C. 1.437

While the resistance value is given as characteristic of the preferred composition, changes in the relative amounts of free acetic acid, ammonium borate, and ammonium acetate as represented by different pH values do not produce pronounced changes in the resistance of the electrolytic mass. Resistance values in the range given are obtained with pH values even as varied as from pH equals 4.5 to pH equals 7.2.

Moreover, even though the ratio of the quantity of boric acid to acetic acid before neutralization with ammonia ($NH_3$) be varied from 1 to 1 (1:1) to 1 to 3.2 (1:3.2), the resistance is substantially unchanged, being in the range of 20 to 35 ohms per c. m.$^3$ at 90° C. This makes available an electrolytic mixture ranging from a thin paste to a heavy plastic mass. For certain types of electrolytic capacitors the heavy plastic mass is preferred.

Capacitor assemblies such as shown in Figs. 1 and 2 are impregnated in a mixture prepared as described by immersion for a suitable length of time and at a suitable temperature. For the more viscous electrolyte mixtures temperatures as high as 100° C. may be used. Three hours usually suffices although the time is not critical. After impregnation the capacitors are preferably subjected to a curing treatment by the application of voltage. This treatment lowers the power factor (which on the completion of the impregnating step may be as high as approximately 10%) to values below 6%. The voltage applied during the curing treatment may be equal to the operating voltage or somewhat higher. The curing period is at least about one hour. In the case of capacitors intended for alternating current use the voltage application preferably is made intermittent with the on and off periods respectively being about 2 seconds and 8 seconds in length.

After the capacitor assembly has been impregnated and cured it is placed in a case such as shown in Fig. 1 which may consist of aluminum or other suitable metal or of a non-conducting material such as hard rubber, fibre, or a suitable thermoplastic material, such as synthetic resin. In place of the particular combination above described various other combinations may be used. Other examples of suitable cryohydric electrolytes are the following, the parts in all cases being by weight:

| | Character of product |
|---|---|
| *Example 2* | |
| Ammonium acetate 75 parts. Disodium hydrogen phosphate 25 parts. | This material is a thin paste at 25° C. |
| *Example 3* | |
| Ammonium acetate 80 parts. Ammonium oxalate 20 parts. | This material is a thin turbid liquid of pasty consistency at 75° C. and a viscous paste at 25° C. |
| *Example 4* | |
| Ammonium acetate 75 parts. Rochelle salts 25 parts. | This liquid is a turbid liquid at 25° C. |
| *Example 5* | |
| Ammonium acetate 80 parts. Ammonium citrate 20 parts. | This mixture is a turbid syrupy liquid at 25° C. |
| *Example 6* | |
| Ammonium acetate 75 parts. Sodium perborate 25 parts. | This mixture is a clear, thin syrup at 25° C. |
| *Example 7* | |
| Ammonium acetate 85 parts. Potassium dichromate 15 parts. | This mixture is a pasty mass at 25° C. |
| *Example 8* | |
| Ammonium acetate 75 parts. Potassium tetraborate 25 parts. | This material is a greasy paste at 25° C. |
| *Example 9* | |
| Ammonium acetate 80 parts. Ammonium carbonate 20 parts. | This mixture is a clear solution at 100° C. and a viscous paste at 25° C. |
| *Example 10* | |
| Ammonium acetate 70 parts. Calcium lactate 30 parts. | This mixture is a syrupy mass at 25° C. |
| *Example 11* | |
| Ammonium acetate 80 parts. Molybdic acid 20 parts. | This mixture is a white syrupy paste at 25° C. |
| *Example 12* | |
| Ammonium acetate 33⅓ parts. Aluminum acetate 33⅓ parts. Trisodium phosphate 33⅓ parts. | This mixture is a soft paste at 25° C. |
| *Example 13* | |
| Sodium acetate 66⅔ parts. Disodium hydrogen phosphate 33⅓ parts. | This mixture is a soft paste at 25° C. |
| *Example 14* | |
| Ammonium formate 75 parts. Ammonium salycilate 25 parts. | This mixture is a soft paste at 25° C. |
| *Example 15* | |
| Ammonium acetate 80 parts. Dextrose 20 parts. | This mixture is a greasy paste at 25° C. |

Capacitors made up by the use of impregnating mixtures such as above described may be stored at room temperature, or even at temperatures as high as 60° C., without loss of initial favorable electrical characteristics. Capacitors impregnated with such mixtures are characterized by power factor less than 6% and a capacity which averages about 1 microfarad for each 7½ square inches of active foil surface. Power factors as low as 3% readily can be obtained. The following values of power factor and capacity over a range of temperatures are characteristic of our invention.

| Temperature | Power factor | Capacity in microfarads |
|---|---|---|
| °C. | Percent | |
| 75 | 5.3 | 94.5 |
| 25 | 4.3 | 88.9 |
| 0 | 4.2 | 86.1 |
| −35 | 3.9 | 75.1 |

Capacitors embodying our invention are also well suited for use in direct current circuits. For such direct current applications the leakage characteristics of the capacitor unit are equal to or even greater importance than the power factor. Capacitors embodying our invention and impregnated with a mixture of ammonium acetate and ammonium borate, as already described, possess the following characteristics when tested at 50 volts direct current plus a superimposed alternating current of 5 volts at 25° C.

Capacity _____ 10 mfds.
Power factor _____ 4%
Milli-amp. leakage _____ .03
Square inches of active foil area/mfd 1.8

After nearly 300 hours continuous voltage application at 60° these capacitors have the following characteristics:

Capacity _____ 9 mfds.
Power factor _____ 4%
Milli-amp. leakage _____ 0

Although it might be assumed from the above illustrative figures that capacitors embodying the present invention are suitable particularly for low voltage direct current use, it should be understood that they operate equally satisfactorily in direct current circuits as high as of 250 volts. Capacitors designed for 250 volt circuits and embodying this invention were found to have a power factor of less than 5%, a leakage of .007 milliampere per microfarad when tested at 25° C. by the application of 250 volts direct current plus 25 volts alternating current.

What we claim as new and desire to secure by Letters Patent of the United States is:

1. In an electrolytic device a cryohydric electrolyte.

2. In an electrolytic device an impregnating composition consisting essentially of a mixture of salts, such mixture being non-crystalline in the working range of temperatures of such capacitor, and being non-crystalline at temperatures at which said salts individually are crystalline.

3. In a capacitor an impregnating composition consisting essentially of a mixture of substantially anhydrous salts one of which is an ammonium salt of an organic acid, such mixture being liquid or semi-liquid at temperatures at which said salts individually are crystalline solids.

4. In a capacitor an impregnating composition consisting essentially of a mixture of ammonium salts of acetic and boric acids.

5. An electrolytic device comprising spaced electrodes at least one of which is film-forming, and a cryohydric electrolyte which is liquid at temperatures as low as 25° C., interposed between said armatures.

6. In an electrolytic device a cryohydric electrolyte comprising a mixture of salts, one of which is a salt of lactic acid.

7. In an electrolytic capacitor a cryohydric electrolyte comprising a mixture of salts, one of which is an ammonium salt of lactic acid.

8. In an electrolytic capacitor a cryohydric electrolyte comprising a mixture of salts including ammonium salts of formic acid and salycilic acids.

9. In a capacitor containing film-forming armatures and an interposed porous spacer, an impregnating composition consisting essentially of a mixture of ammonium salts of boric and acetic acids, said salts having the same proportion as an ammonium salt mixture made by neutralizing with ammonia a mixture of boric and acetic acids, said boric and acetic acids varying in proportion from 1:1 to 1:3.2 by weight.

FRANK M. CLARK.
JOHN H. KOENIG.